United States Patent [19]

Apfel

[11] 4,147,409
[45] Apr. 3, 1979

[54] LASER REFLECTOR WITH REDUCED ELECTRIC FIELD INTENSITY

[75] Inventor: Joseph H. Apfel, Santa Rosa, Calif.

[73] Assignee: Optical Coating Laboratory, Inc., Santa Rosa, Calif.

[21] Appl. No.: 744,198

[22] Filed: Nov. 22, 1976

[51] Int. Cl.$^2$ .................................... G02B 5/28
[52] U.S. Cl. .................. 350/164; 331/94.5 C; 350/166; 350/288
[58] Field of Search .............. 350/164, 165, 166, 288; 331/94.5 C

[56] References Cited

U.S. PATENT DOCUMENTS

| | | | |
|---|---|---|---|
| 3,637,294 | 1/1972 | Berthold | 350/166 |
| 3,853,386 | 12/1974 | Ritter et al. | 350/164 |
| 4,009,453 | 2/1977 | Mahlein | 350/166 X |

FOREIGN PATENT DOCUMENTS

211597  11/1957  Australia .................. 350/166

OTHER PUBLICATIONS

Bangert et al, "Design of Laser Mirrors With Intermediate Reflectances," *Optics Communications*, vol. 6, No. 4, Dec. 1972, pp. 399–401.

Newnam et al, "Laser Damage Resistance and Standing-wave Fields in Dielectric Coatings," *Topical Meeting on Optical Interference Coatings*, Abstract #THA9 (Feb. 26, 1976), *JOSA*, vol. 66, No. 2, Feb. 1976, p. 166.

*Primary Examiner*—John K. Corbin
*Assistant Examiner*—John D. Lee
*Attorney, Agent, or Firm*—Flehr, Hohbach, Test, Albritton & Herbert

[57] ABSTRACT

Laser reflector with reduced electric field intensity having a substrate having an optically smooth surface with a multilayer thin film optical coating disposed on the surface. The coating is comprised of high and low index layers formed in first and second groups with the first group being formed of layers having optical thicknesses substantially equal to one quarter of the wave length of the laser beam and the second group being formed of layers having optical thicknesses which are substantially different from one quarter of the wave length of the laser beam in which $\theta$ is the phase thickness of the low index layer defined by the equation $$\cos 2\theta = \frac{f(1-r)^2 + (1-fr)(r-f)\cos 2\phi}{r(1-f)^2}$$

and $\phi$ is the phase thickness of the high index layer defined by the equation $$\tan 2\phi = \frac{v(1-f^2)}{u(1+f^2) - f(1+u^2+v^2)}$$

where $r$ is the amplitude of reflectance at the outermost surface of the first group of layers for the first pair of layers in the second group of layers and at the outermost surface of the preceding pair of layers for each succeeding pair of layers in the second group of layers as determined from within the added low index layer of the second group of layers, where $f$ is $(n_1-n_2)/(n_1+n_2)$ where $n_1$ is the refractive index of the low index material, and $n_2$ is the refractive index of the high index material and where $u = r\cos 2\theta$ and $v = -r\sin 2\theta$.

4 Claims, 11 Drawing Figures

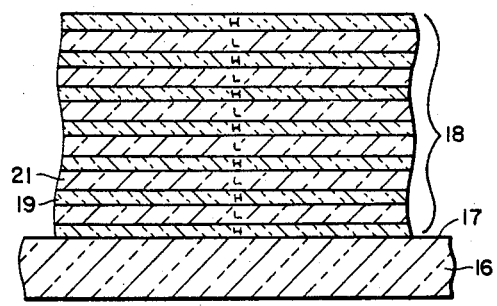
FIG_1
(PRIOR ART)
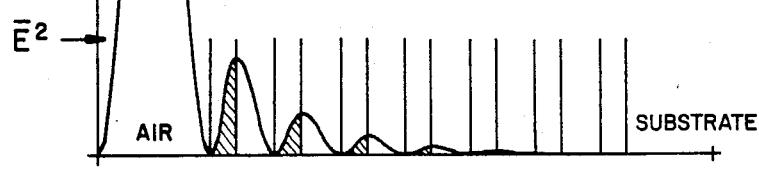
FIG_2
(PRIOR ART)
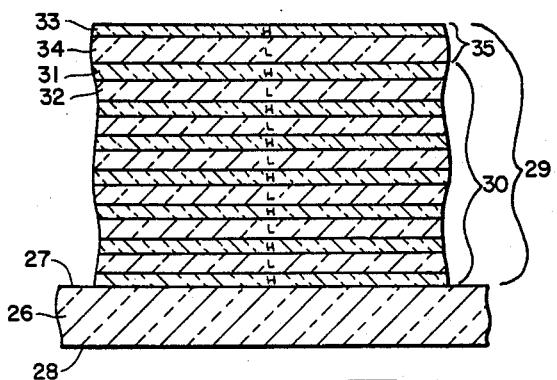
FIG_3
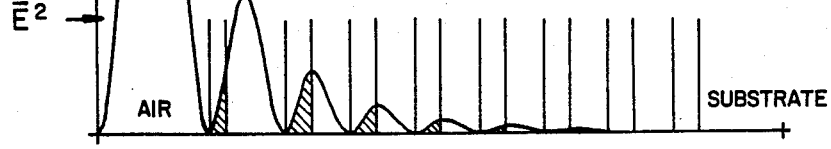
FIG_4
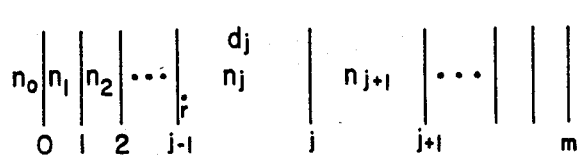
$$E_j = \frac{1 + re^{2i\phi_j}}{(1+r)e^{i\phi_j}} E_{j-1} \qquad \phi_j = \frac{2\pi n_j d_j}{\lambda}$$
FIG_5
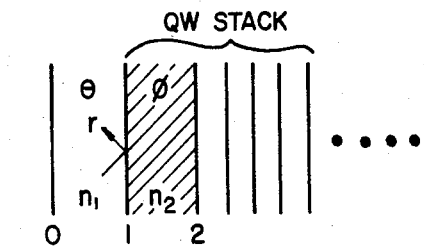
FIG_6

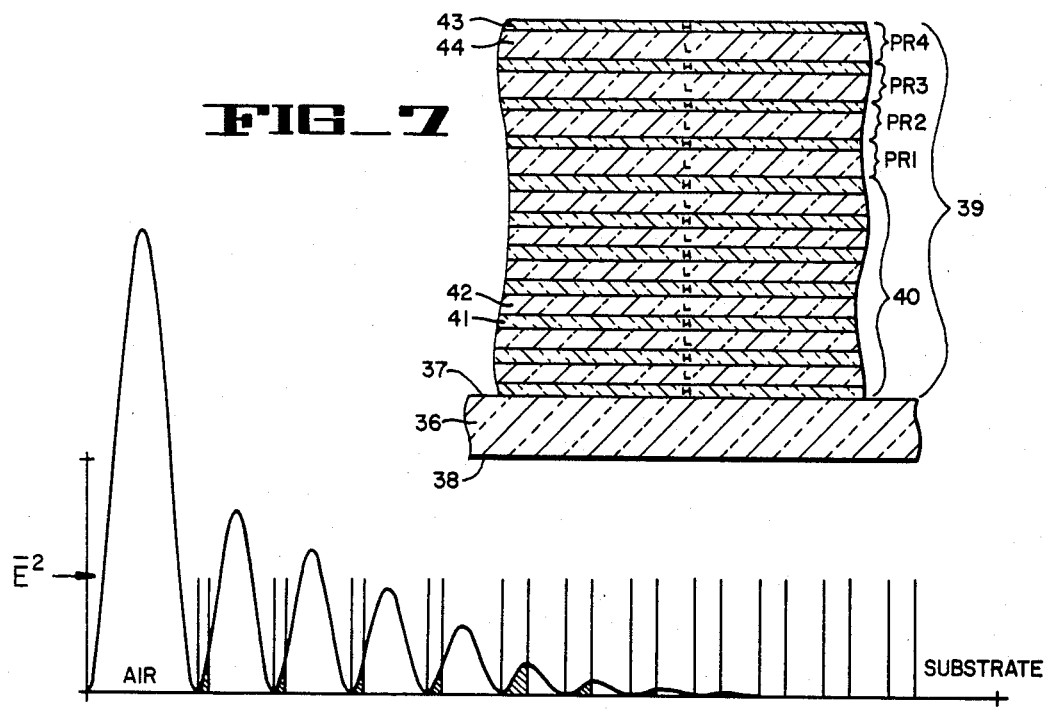
FIG_7
FIG_8
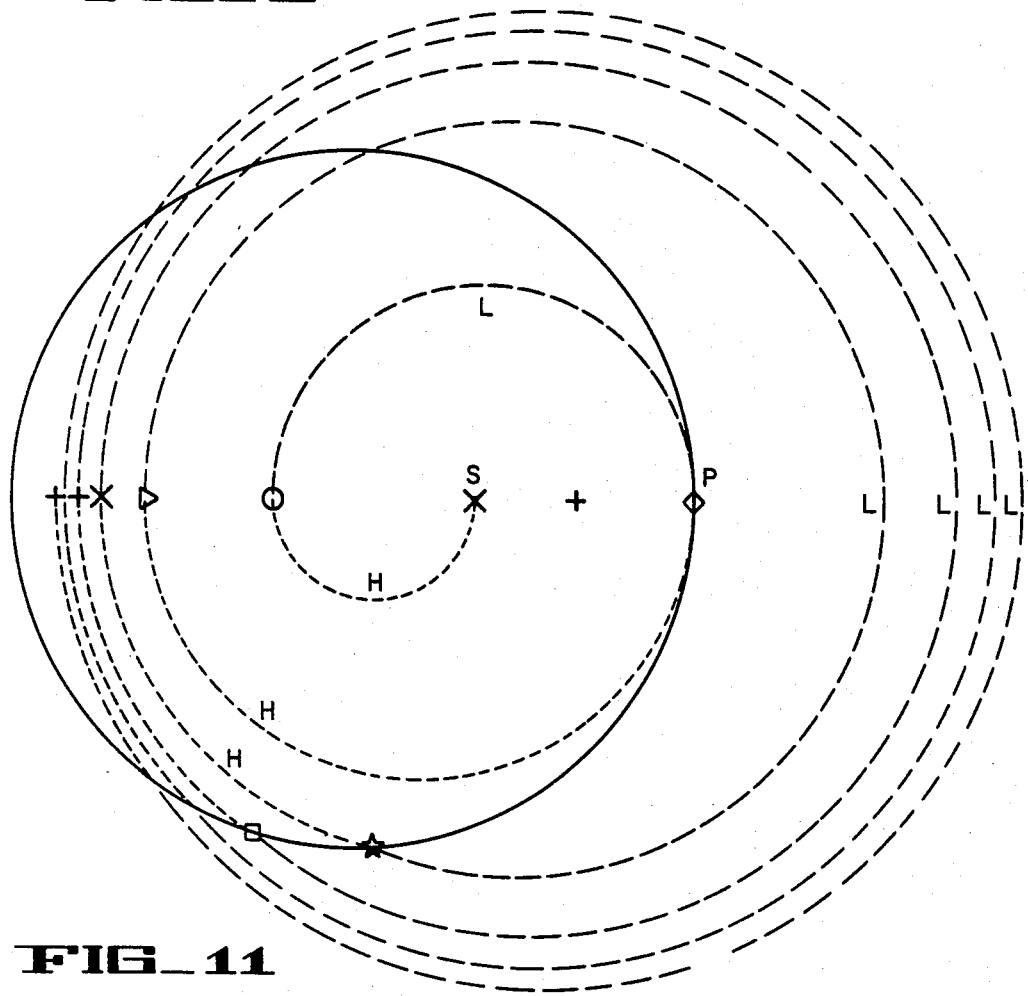
FIG_11

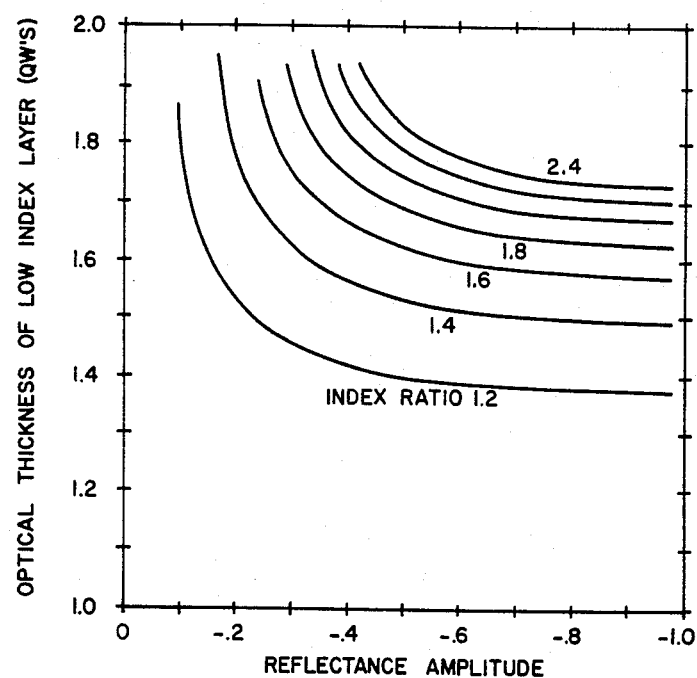
FIG_9
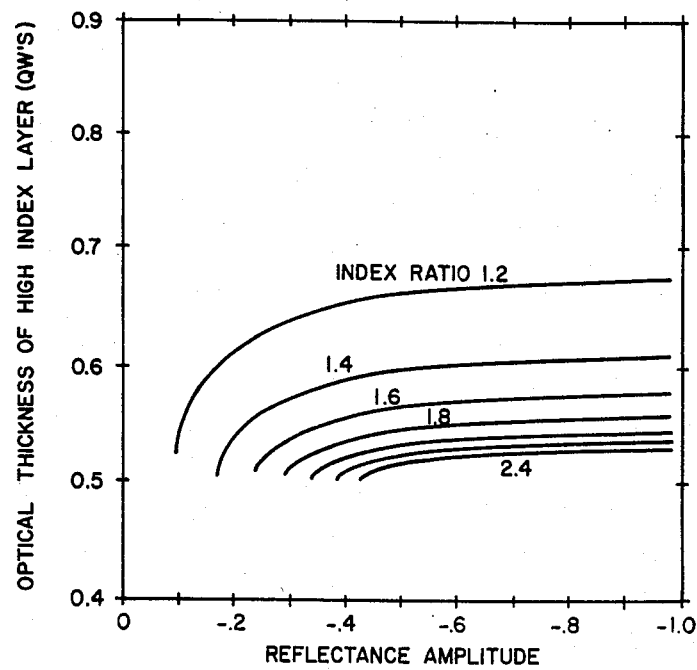
FIG_10

LASER REFLECTOR WITH REDUCED ELECTRIC FIELD INTENSITY

BACKGROUND OF THE INVENTION

Laser Reflectors have heretofore been provided which have utilized optical coatings. However, it has been found that when such optical coatings are illuminated by very intense beams of radiation such as provided by high power lasers, they are damaged so they are unusuable. Such coatings are particularly disadvantageous in certain applications as for example, high power lasers used for thermonuclear fusion experiments. Therefore there is a need for a new improved optical coating for use as a laser reflector.

SUMMARY OF THE INVENTION AND OBJECTS

The laser reflector consists of a substrate having first and second optically smooth surfaces. A multilayer thin film optical coating is disposed on one of the surfaces. The coating is comprised of alternating high and low index layers formed in first and second groups. The first group is formed of layers having optical thicknesses substantially equal one quarter of the wave length of the laser beam. The second group is formed of layers having an optical thickness which is substantially different from one quarter of the wave length of the laser beam in which $\theta$ is the phase thickness of the low index layer defined by the equation $$\cos 2\theta = \frac{f(1-r)^2 + (1-fr)(r-f)\cos 2\phi}{r(1-f)^2}$$

and where $\phi$ is the phase thickness of the high index layer defined by the equation $$\tan 2\phi = \frac{v(1-f^2)}{u(1+f^2) - f(1+u^2+v^2)}$$

where r is the amplitude of reflectance at the outermost surface of the first group of layers for the first pair of layers in the second group of layers and at the outermost surface of the preceding pair of layers for each succeeding pair of layers in the second group of layers as determined from within the added low index layer of the second group of layers, where f is $(n_1-n_2)/(n_1+n_2)$ where $n_1$ is the refractive index of the low index material, and $n_2$ is the refractive index of the high index material and where $u = r\cos 2\theta$ and $v = -r\sin 2\theta$.

In general it is an object of the present invention to provide a laser reflector which has reduced electric field intensity.

Another object of the invention is to provide a laser reflector of the above character which can be readily designed for normal or near normal incidence and which also can be designed using the same principles for non-normal incidence.

Another object of the invention is to provide a laser reflector of the above character which can be designed according to the plane of polarization for which it is to be used.

Another object of the invention is to provide a laser reflector of the above character in which a quarter wave stack is utilized and in which two or more of the layers have non-quarter wave optical thicknesses which are adjacent to the surface on which radiation is first incident.

Another object of the invention is to provide a laser reflector of the above character in which a number of the layers are non-quarter wave optically thick and are always of an even number.

Another object of the invention is to provide a laser reflector of the above character in which there are provided alternating high and low index layers in two groups, one group of layers which have optical thicknesses of one quarter wave length and the other group of layers which have optical thicknesses of non-quarter wave length.

Additional objects and features of the invention will appear from the following description in which the preferred embodiments are set forth in detail in conjunction with the accompanying drawings.

BRIEF DESCRIPTION OF THE DRAWINGS

FIG. 2 is a graph showing the time averaged square of the electric field in the thirteen layer prior art quarter wave stack shown in FIG. 1 as a function of distance measured normal to the surface of the layers for radiation incident from the left is viewed in FIG. 2. The high index layers are indicated by a cross-hatching.

FIG. 4 is a graph showing the electric field intensity profile of a fifteen layer reflector shown in FIG. 3 in which the peak value in the high index material is lower than for a conventional quarter wave stack reflector.

FIG. 5 shows the recursion formula for the tangential component for the electric field strength at the interfaces of the multilayer for the radiation incident from the left as viewed in FIG. 4.

FIG. 6 gives a definition of the terms used in equation (2).

FIG. 8 is an electric field intensity profile of a twenty-one layer reflector shown in FIG. 7 in which the peak value is the same for the first five high index layers as seen by the radiation incident from the left as viewed in the FIG. 8.

FIG. 9 gives the optical thickness of the low index layer as a function of the reflectance amplitude of the multilayer before addition of the modifying pair. Curves are shown for various ratios of the high to the low index coating materials.

FIG. 10 shows the optical thickness of the high index layer as a function of reflectance amplitude of the multilayer before addition of the modifying pair. Curves shown are for various ratios of the high to low index materials.

FIG. 11 is a circle diagram of the complex reflectance amplitude for an eleven layer reflector with four modifying pairs of layers. The reflectance vector extends from the origin (+) to the curve starting with the uncoated substrate and following through successive high (H) and low (L) index layers to the final position of the negative real axis. The intersections between the layers of the four modifying pairs fall on the circle of constant admittance passing through the point P on the real axis.

BRIEF DESCRIPTION ON THE PREFERRED EMBODIMENTS

The conventional laser reflector typical of the prior art is shown in FIG. 1 and consists of a substrate 16 which is provided with surface 17 having a quarter wave stack 18 of non-absorbing layers. The quarter wave stack 18 shown in FIG. 1 consists of thirteen alternating layers of two materials, one which has a high refractive index and the other which has a low refractive index. The high index layers 19 and the low index layers 21 are marked with the designation H and L respectively. As can be seen from FIG. 1, the first and last layers are formed of a high index material. Each layer has an optical thickness of one quarter of the wave length for which the reflector is designed. Since the reflector is for a laser beam it is only necessary that the reflector reflect the very narrow band wave length of laser beam. By way of example, a prior art reflector such as that shown in FIG. 1 could use a high index material such as titania having an index of refraction 2.175 and a low index material such as silica having an index of refraction 1.45. The substrate could have a refractive index of 1.45. The design would have a high reflectance on the order of 0.9906.

The electric field intensity of the reflector shown in FIG. 1 is plotted in FIG. 2 for a single cycle of variation in the incident medium whose refractive index is 1.0 to represent air or a vacuum. It can be seen from FIG. 2 that within the reflector the field varies from minimum to maximum values in each layer with extreme values occuring at the interfaces between the layers. It has been found that when a multilayer reflector of this design composed of titania high index layers and silica low index layers is subjected to intense short pulse radiation (30 picoseconds pulse length) from 1.064 micrometer wave length laser, the quarter wave stack 18 will be damaged if the electric field in any of the titania high index layers 19 (cross hatched layers in FIG. 2) reaches a critical value. This will occur at the first interface seen by the incoming radiation. It has also been found that the low index silica layers will survive at an intensity level of approximately 2.3 times the critical level for the titania. Therefore, if the electric field intensity can be suppressed in the high index layers the threshold for damage will be increased.

A laser reflector incorporating the present invention is shown in FIG. 3 and consists of substrate 26 having optically smooth surfaces 27 and 28. A multilayer coating 29 is disposed on the optically smooth surface 27. The coating includes a quarter wave stack 30 comprised of a plurality or a first group of thirteen layers formed of high and low index materials. These thirteen layers in the stack 30 are identical to the thirteen layers shown in stack 18 in FIG. 1. Thus, there are provided high index layers 31 and low index layers 32 which also have been identified by letters H and L as shown in FIG. 3. Each layer has an optical thickness of one quarter of the wave length to be reflected. The coating 29 includes another or second group 35 of high and low index layers 33 and 34 respectively. The layers 33 and 34 are positioned so that they will be the first to be encountered by the incoming radiation.

By way of example in the coating 29, the high index material was titania having an index of refraction of 2.175 and the low index material was silica having an index of a refraction of 1.45. The substrate index of refraction was 1.45. The layers 31 and 32 had quarter wave optical thicknesses of 1.0. Quarter wave optical thicknesses are given as multipliers of the wavelength for the actual design. In other words the quarter wave optical thickness (QWOT)=4nd where d=physical thickness of a layer n=index of refraction of the material used in the layer and nd=optical thickness of a layer.

The high index layer 33 which is exposed to the medium (air) had a quarter wave optical thickness of 0.5922 whereas the low index layer 34 had a quarter wave optical thickness of 1.536. The addition of the two layers 33 and 34 did not reduce the reflectance of the reflector. In fact the reflector had a reflectance of 0.9939 which was a slight improvement over the reflectance of the reflector shown in FIG. 1.

FIG. 4 shows the electric field profile of the fifteen layer reflector shown in FIG. 3. From the cross hatched areas shown in FIG. 4, it can be seen that a multilayer coating of the present design has a lower peak electric field intensity within the high index material. The reflector shown in FIG. 3 therefore should survive higher incident laser pulse energy density without damage.

In examining the theory of field intensity, it is found that the recursion formula for the tangential component of the electric field strength at adjacent interfaces within a multilayer coating is (see FIG. 5)

$$E_j/E_{j-1} = (1 + re^{i2\phi_j})/(1 + re^{i\phi_j}) \tag{1}$$

where r is the amplitude reflectance in the region between the two interfaces at a point adjacent to the $(j-1)$ interface and $\phi$ is the phase thickness of the intervening layer of thickness d according to the relation $\phi = 2\pi nd/\lambda$. If the material extending between the j and $j-1$ interfaces is absorbing then the phase thickness will be a complex number because the refractive index n will take the form (n-ik). However, for this analysis, it shall be assumed that both materials are sufficiently free of absorption that absorption can be neglected.

As can be seen from equation (1), the electric field intensity within a multilayer to the right of a given point is not changed by anything which is done to the left of that point except to increase or decrease the entire profile. (Right and left are to be understood as forward and reverse with respect to the direction of incident radiation.) Thus, once a profile of field intensity is determined for a multilayer coating, only its magnitude can be changed by additional layers applied on the side of incidence.

The objective of the present invention is to determine the thicknesses of the two outer layers 33 and 34 which, when added to the conventional reflector, will suppress the peak electric field intensity within the high index material. This same approach can be utilized to suppress the peak field in the low index material at the expense of increased intensity in the adjacent high index layer.

One necessary condition to meet the objective is that the peak field intensity within the added high index layer be equal to the peak field in the next high index layer (in the direction of energy flow) and that the reflectance of the total multilayer be a maximum. The second condition is equivalent to requiring that the amplitude reflectance of the total multilayer coating be a negative value with no imaginary component. This can be described as the reflectance with phase of 180° or a pure real admittance. From the view of electric field intensity profiles, the second condition requires that the field have a minimum at the first surface of the filter.

The first condition set forth above specifies that the field intensity at the first interface between the two materials must equal the field at the next similar interface. By means of the recursion equation 1 and the parameter definitions of FIG. 6, this condition can be mathematically stated $$\left| \frac{1 + re^{-2i\theta}}{(1 + r)e^{i\theta}} \right|^2 = \left| \frac{(1 - fr) + (r = f)e^{2i\phi}}{(1 - fr + r - f)e^{i\phi}} \right|^2 \tag{2}$$

$\phi$ is the phase thickness ($2\pi nd/\lambda$) of the high index layer lying between surfaces 1 and 2 of design (see FIG. 6), surface 1 is the outermost surface of the outermost layer of the first group of layers comprising the conventional quarter wave stack reflector, $\pi$ is the phase thickness ($2\pi nd/\lambda$) of the low index layer to be added to the original design. The term r is the amplitude reflectance at the surface 1 as determined from within the added low index layer. The term f is $$(n_1 - n_2)/(n_1 + n_2) = (1-n)/(1+n) \quad (3)$$

where $n_1$ is the refractive index of the low index material, $n_2$ is the refractive index of the high index material, and $n = n_2/n_1$.

Equation (2) can be algebraicly manipulated to yield the phase thickness of the added low index layer as set forth below $$\cos 2\theta = \frac{f(1-r)^2 + (1-fr)(r-f)\cos 2\phi}{r(1-f)^2} \quad (4)$$

The phase thickness of the high index layer $\phi$ is 90° for a conventional quarter wave stack reflector.

Equation 4 specifies that the phase thickness of the added low index layer when interpreted with the knowledge that the optical thickness of that layer must exceed one quarter wavelength (i.e. that $90° < \phi < 180°$).

With the low index layer thickness specified, there remains to be determined the thickness of the high index layer required to fulfill the second condition of a real (not complex) amplitude reflectance for the composite. The solution is found in two steps; evaluation of the complex reflectance of the multilayer after adding the first (low index) layer and, determining the necessary thickness of the high index material to transform the system reflectance to a phase of 180°.

In accomplishing this two step derivation, it shall be assumed that the incident medium has a refractive index equal to that of the low index material. This assumption does not change any of the required conditions and can be reversed after the design is completed in order to determine the reflector performance in another incident medium. With this assumption, amplitude reflectance of the reflector can be expressed after adding a low index layer of phase thickness $\theta$, by the term $re^{i2\theta}$. Thus the magnitude of the amplitude reflectance is equal to that of the quarter wave stack and the phase is shifted by the angle $-2\theta$.

It should be noted that for a normal quarter wave stack composed of an odd number of alternating high and low index layers the amplitude reflectance r is negative to represent a reflected phase of 180°. Thus, the amplitude reflectance after adding the specified layer has a phase of $(180° - 2\theta)$ and magnitude $|r|$.

The complex reflectance can also be expressed in the form of $$re^{-i2\theta} = u + iv,$$

$$u = r \cos 2\theta$$

$$v = -r \sin 2\theta \quad (5)$$

The final step is to determine the required thickness of the high index material to transform this reflectance to a pure real value with phase of 180°. From the theory of circle diagrams and by the use of plane geometry there can be derived the equation $$\tan 2\phi = \frac{v(1-f^2)}{u(1+f^2) - f(1+u^2+v^2)} \quad (6)$$

Where $\phi$ is the phase thickness of the high index layer and f is defined by equation (3).

The process for deriving the phase thicknesses of $\theta$ and $\phi$ for the two additive layers can be repeated if the value of $\phi$ from equation 6 is inserted in equation 4 and one has the value for the amplitude reflectance r for the reflector with each new pair of layers. Circle diagram theory may be used to derive the amplitude reflectance $$r = \frac{-B + SGN(v)(B^2 - 4AC)^{\frac{1}{2}}}{2A} \quad (7)$$

where
$A = uK - 1$
$B = K[1 - (u^2 + v^2)]$
$C = (u^2 + v^2) - uK$
$K = (1 - n^2)/(1 + n^2)$
$SGN(V) = v/|v|$ It is this value of r which must be used along with $\phi$ from equation 6 for each new pair of layers.

In FIG. 7, there is shown a laser reflector incorporating the present invention which consists of a substrate 36 having first and second optically smooth surfaces 37 and 38. A multilayer coating 39 is disposed on the surface 37. The coating includes one or a first group or stack 40 of layers consisting of alternating consecutive high index layers 41 and low index layers 42 having optical thicknesses of one quarter wave length. The multilayer coating 39 also includes another or second group of high and low index layers 43 and 44 respectively having optical thicknesses which are substantially different than one quarter wave length.

The layers 43 and 44 form pairs of added alternating or consecutive high and low index layers, the first pair of added layers being identified as PR1, the second as PR2 the third as PR3 and the fourth as PR4. The thickness of the first and second layers of each pair added to a quarter wave stack are determined by the refractive indices of the high and low refractive index film materials and the reflectance of the group of layers to which the pair is added. Thus, the thickness of the two layers in each pair of added layers is different from the thickness of the layers in the previously added pair and is not dependent on the number of further added pairs. The phase thickness of the outermost layer of each preceding pair must be considered in conjunction with determining the thickness of the layers of each succeeding pair in the second group of layers. Thus r will be determined from the outermost surface of the outermost layer of the preceding pair.

By way of example, a reflector of the type shown in FIG. 7 having thirteen layers in the quarter wave stack 40 and having four pairs of added layers to provide a twenty-one layer multilayer coating had a reflectivity of 0.9971. The high index material utilized was titania having an index of refraction of 2.175 and the low index material utilized was silica having an index of refraction of 1.45. The substrate had an index of 1.45. The thicknesses of the high and low index layers 43 and 44 of the pairs PR1 through PR4 are set forth on the following page.

| WAVELENGTH = 1 | | |
|---|---|---|
| PR1 | INDEX | QW'S |
| | 1.4500 | 1.535441 |
| | 2.1750 | 0.592231 |
| PR2 | INDEX | QW'S |
| | 1.4500 | 1.640983 |
| | 2.1750 | 0.483239 |
| PR3 | INDEX | QW'S |
| | 1.4500 | 1.696536 |
| | 2.1750 | 0.419569 |
| PR4 | INDEX | QW'S |
| | 1.4500 | 1.732280 |
| | 2.1750 | 0.376161 |

FIG. 8 shows the electric field intensity profile for the laser reflector shown in FIG. 7. Note that in this case, the field intensity in the high index (cross hatched) layers is the same for the first five pairs and thereafter decreases. Four added pairs have same peak field as that in the outer layer of stack.

In FIG. 9 there is a graph of the optical thickness (measured in quarter waves) of the low index layer for the first added layer on a conventional quarter wave stack as given by equation (4). The abscissa is the amplitude reflectance of the conventional quarter wave stack prior to addition of any modification.

FIG. 10 is the optical thickness (measured in quarter waves) of the high index layer as given by equation (6). The abscissa is the same as for FIG. 9.

FIGS. 9 and 10 apply only for the first pair of modifying layers added to the conventional quarter wave stack. Second and further pairs can be designed by the repetitive use of equations (4), (6), and (7). In both FIGS. 9 and 10, the optical thickness of the added layers is not a strong function of reflectance at high amplitude, therefore, the thicknesses of the two layers can be approximated by substituting $r = -1$ into equations (4), (5) and (6). The results are $$\cos 2\theta = (n^2 - 2)/n^2 \quad (8)$$

$$\tan 2\phi = -2n(n^2 - 1)^{\frac{1}{2}} \quad (9)$$

The table set forth below contains values of equations (8) and (9) for various ratios of the high to low refractive index ratio n.

| | Low Index Layer | | High Index Layer | |
|---|---|---|---|---|
| n | cos 2θ | QW's | tan 2Φ | QW's |
| 1.1 | −0.653 | 1.274 | −1.008 | 0.749 |
| 1.2 | −0.389 | 1.373 | −1.592 | 0.679 |
| 1.3 | −0.183 | 1.441 | −2.160 | 0.638 |
| 1.4 | −0.020 | 1.494 | −2.743 | 0.611 |
| 1.5 | 0.111 | 1.535 | −3.354 | 0.592 |
| 1.6 | 0.219 | 1.570 | −3.997 | 0.578 |
| 1.7 | 0.308 | 1.600 | −4.674 | 0.567 |
| 1.8 | 0.383 | 1.625 | −5.388 | 0.558 |
| 1.9 | 0.446 | 1.647 | −6.139 | 0.551 |
| 2.0 | 0.500 | 1.667 | −6.928 | 0.546 |
| 2.1 | 0.546 | 1.684 | −7.756 | 0.541 |
| 2.2 | 0.587 | 1.700 | −8.622 | 0.537 |
| 2.3 | 0.622 | 1.714 | −9.528 | 0.533 |
| 2.4 | 0.653 | 1.726 | −10.472 | 0.530 |
| 2.5 | 0.680 | 1.738 | −11.456 | 0.528 |
| 2.6 | 0.704 | 1.749 | −12.480 | 0.525 |
| 2.7 | 0.726 | 1.758 | −13.543 | 0.523 |
| 2.8 | 0.745 | 1.768 | −14.646 | 0.522 |
| 2.9 | 0.762 | 1.776 | −15.788 | 0.520 |
| 3.0 | 0.778 | 1.784 | −16.971 | 0.519 |

FIG. 11 is a circle diagram description of the design technique. In FIG. 11 there is shown the complex reflectance of the quarter wave stack with several added pairs designed with equal peak field in the high index layers. The locations of the complex reflectance vector at the end of each pair is on the negative real axis (phase of 180°). The locations of the intermediate interfaces fall on a circle whose center is on the real axis passing through $r = -1$. This is a circle of constant real admittance, one of the two sets of circles comprising the Smith chart. This is generally true as will be shown below in establishing the admittance theory.

The recursion formula for the electric field in a multilayer can be expressed as a function of reflectance (as in equation 1) or admittance.

$$E_j/E_{j-1} = 2e^{-i\phi_j}/[(1 + Y_j/n_j) + (1 - Y_j/n_j)e^{-2i\phi_j}] \quad (10)$$

If the $j^{th}$ interface follows a high index layer interface 1 in FIG. 6), then $Y_j$ must be pure real to satisfy the previously stated condition of maximum reflectance amplitude. The second condition is that the field intensity be equal at the $j-1$ and $j+1$ interfaces. Thus, $|E_{j-1}|^2 = |E_{j+1}|^2$ can be written $$\frac{|E_{j-1}|^2}{|E_j|^2} = \frac{|E_{j+1}|^2}{|E_j|^2} \quad (11)$$

Equation (11), along with the recursion formula for field (10), and the recursion formula for admittance are combined and manipulated to show that $$Re(Y_{j-1}) = Re(Y_{j+1}) \quad (12)$$

with the intermediate results:

$$Re(Y_{j-1}) = 2Y_j/\{[1 + (Y_j/n_j)^2] + [1 - (Y_j/n_j)^2]\cos 2\theta\} \quad (13)$$

$$Re(Y_{j+1}) = 2Y_j/\{[1 + (Y_j/n_{j+1})^2] + [1 - (Y_j/n_{j+1})^2]\cos 2\theta\} \quad (14)$$

Thus, the location of the complex reflectance vector at the end of each low index layer falls on a circle of constant Re (Y). If $r_o$ is the amplitude reflectance of the quarter wave stack prior to the last high index layer, then the circle passes through $r_o$, and $-1$ with its center on the real axis.

From the foregoing it can be seen that in order to control the peak or maximum value of the electric field intensity in a multilayer reflector, the design can be modified by changing the optical thickness of the layers adjacent to the incident side. When the design is modified to suppress the peak field intensity in one material it is caused to increase in an adjacent layer. To decrease the field in the high index material the thickness of the low index layers is increased and the thickness of the high index layers is decreased. Equations (4) and (6) are used to calculate the precise thicknesses required for equal peak field intensities in alternate layers. Equations (8) and (9) and the table set forth on page 16 hereof provide the thicknesses for a single pair of layers added to a high reflection stack.

From the foregoing it can be seen that there has been provided a laser reflector which is capable of withstanding substantially greater intensities of laser radiation than the conventional laser reflectors. Optical performance of the laser reflector is not sacrificed in order to provide this increased capability for withstanding higher intensities of laser radiation.

Although the description in the present invention has been confined to laser reflectors for use at near normal incidence, the same techniques can be used equally well for non-normal incidence according to the same principles that a multilayer thin film reflector coating can be designed for use at a particular incidence angle. In other words the formulas and design principles of the present invention can be applied to non-normal incidence in the same way that the formulas and design principles of a quarter wave stack can be applied for radiation incident at a particular angle.

It should be appreciated that the reflectance and transmittance of a coated reflector for radiation incident at an oblique angle are generally different for the two planes of polarization. Therefore the reflector should be designed according to the plane of polarization for which it is to be used. Similarly the application of the formulas and design principles of the present invention should accommodate the polarization plane for which the reflector is to use in cases of non-normal incidence.

In all of the embodiments of the present invention, it can be seen that there has been provided a multilayer coating which is adapted to be deposited on an optically smooth surface in a conventional manner such as by evaporation. The multilayer coating is formed of two groups of high and low index layers. In one group of high and low index layers, the layers have optical thicknesses of one quarter wave length. In the other group of high and low index layers, the layers have optical thicknesses which are non-quarter wave.

The laser reflector of the present invention can also be expressed as consisting of a plurality of layers a number of which form a quarter wave stack in which two or more of the layers have non-quarter wave optical thicknesses according to precise formulas. The two or more layers with modified thicknesses are those layers adjacent to the surface on which radiation is first incident. The number of layers to be non-quarter wave optical thick is always even i.e. 2, 4, 6 etc.. The additional two or more layers added to the side of incidence serve to increase the resistance of the laser reflector to damage by high intensity radiation. The additional two (or more) layers increase the reflectance of quarter wave stack but not with the same degree of effectiveness as two layers whose optical thickness are exactly one quarter wave length.

The formulas and design principles herein disclosed can be implemented so that the number of layers with nonexact quarter wave optical thickness is any even number because of the inter relationships between adjacent and alternate layers. In effecting the increase in resistance to damage by high energy laser radiation (high intensity radiation in general) there is a number of pairs of modified layers beyond which very little if any benefit is derived. It is the present belief that two or three pairs of modified layers are optimum and that little benefit will be derived from a greater number of pairs.

It is believed that the present design is effective in enhancing the resistance of the laser reflectors to damage by high intensity radiation for reasons set forth below. The optical characteristics of the multilayer interference coating result from the constructive interference of light waves traversing forward and backward within the layers. The incident radiation from one direction is transmitted and reflected at each interlayer boundary according to the difference in refractive indices of the two materials adjacent to the boundary. The forward and the reverse flowing waves within the multilayer may constructively add to the intensity which is in some cases greater than the intensity of the incident radiation. Conversely the destructive or subtractive combination of forward and reverse waves can provide an intensity level which is less than that of the incident radiation or of transmitted radiation passed out of the coating in the forward direction.

Calculation of the radiation intensity within a multilayer coating may be accomplished with formulas such as are provided in the paper entitled "Electric Field and Multilayers at Oblique Incidence" published in October, 1976 issue of Applied Optics, Volume 15, No. 10, pages 2339-2343. The occurrence of damage in a multilayer coating by laser radiation correlates with the location of the peak or maximum value of the radiation intensity within the coating material with the lowest resistance to damage. In connection with the present invention the profile of radiation intensity within a quarter wave reflector was examined for the purpose of changing the design so as to lower the peak radiation intensity within one of the materials (i.e. $TiO_2$) without appreciably detracting from the reflectance of the coating. By means of mathematical formulas set forth above it has been demonstrated that there is an exact solution for optimally achieving the desired effect.

The logic steps in arriving at the present invention can be summarized as follows:

1. Damage by short pulse laser radiation to coatings is a threshold phenomenon; no damage at pulse energy densities below a critical or threshold value, always damage above this value.
2. For different arrangements of layers, the threshold varies in such a way that the internal electric field intensity at threshold is the same value within the weaker of the two materials.
3. For silica ($SiO_2$) and titania ($TiO_2$) multilayers the high index titania has the lower critical electric field intensity; perhaps as much as 2.3 times lower than for silica.
4. Therefore, designs with reduced electric field intensity within the titania layers should have higher damage threshold so long as the low index silica films are exposed to fields below their critical level.

Although the present invention has been principally described in connection with specific materials ($TiO_2$ and $SiO_2$) the same principles and designs can be utilized with other materials.

It is apparent from the foregoing that there has been provided a laser reflector which has greatly improved capabilities with respect to intense beams of laser radiation in that they are capable of excellent performance without danger of becoming damaged. The reflectance is not degraded significantly.

I claim:

1. In a laser reflector for reflecting a laser beam, a substrate having a first optically smooth surface, a multilayer thin film optical coating disposed on said first surface, said coating being comprised of alternating high and low index layers formed in first and second groups of layers, the first group of layers being formed of alternate high and low index layers having optical thicknesses substantially equal to one quarter of the wave length of the laser beam to be reflected, the second group having optical thicknesses which are substantially different from one quarter of the wave length of the laser beam being reflected wherein $\theta$ the phase thickness of the low index layer is defined by the equation $$\cos 2\theta = \frac{f(1-r)^2 + (1-fr)(r-f)\cos 2\phi}{r(1-f)^2}$$

and $\phi$ is the phase thickness of the high index layer defined by the equation $$\tan 2\phi = \frac{v(1-f^2)}{u(1+f^2) - f(1+u^2+v^2)}$$

where r is the amplitude of reflectance at the outermost surface of the first group of layers for the first pair of layers in the second group of layers and at the outermost surface of the preceding pair of layers for each succeeding pair of layers in the second group of layers as determined from within the added low index layer of the second group of layers, where f is $(n_1-n_2)/(n_1+n_2)$ where $n_1$ is the refractive index of the low index material, and $n_2$ is the refractive index of the high index material and where $u = r \cos 2\theta$ and $v = -r \sin 2\theta$.

2. A reflector as in claim 1 wherein said high index material is titania and said low index material is silica.

3. A reflector as in claim 1 wherein the first group of layers is comprised of at least thirteen layers of high and low index materials.

4. In a laser reflector, a substrate having an optically smooth surface and a multilayer thin film coating disposed on said surface, said coating being comprised of alternating high and low index layers formed in first and second groups with the first group being formed of layers having optical thicknesses substantially equal to one quarter of the wavelength of the laser beam to be reflected and the second group being formed of layers having optical thicknesses which are substantially different from one quarter of the wavelength of the laser beam, said second group being formed of at least two pairs of consecutive high and low index layers and in which $\theta$ the phase thickness of the low index layer in the second group is defined by the equation $$\cos 2\theta = \frac{f(1-r)^2 + (1-fr)(r-f)\cos 2\phi}{r(1-f)^2}$$

and $\phi$ the phase thickness of the high index layer in the second group is defined by the equation $$\tan 2\phi = \frac{v(1-f^2)}{u(1+f^2) - f(1+u^2+v^2)}$$

where r is the amplitude of the reflectance at the outermost surface of the first group of layers for the first pair of layers in the second group of layers and at the outermost surface of the preceding pair of layers for each succeeding pair of layers in the second group of layers as determined from within the added low index layer of the second group of layers, where f is $(n_1-n_2)/(n_1+n_2)$ wherein $n_1$ is the refractive index of the low index material, and $n_2$ is the rerefractive index of the high index material and where $u = r \cos 2\theta$ and $v = -r \sin 2\theta$.

* * * * *